Patented Jan. 9, 1951

2,537,641

UNITED STATES PATENT OFFICE 2,537,641

CHLORINATION OF SYNTHETIC POLYMERS

Albert Bartovics, Little Falls, N. J., assignor to The Firestone Tire & Rubber Company, Akron, Ohio, a corporation of Ohio No Drawing. Application June 5, 1947, Serial No. 752,847

9 Claims. (Cl. 204—163)

This invention relates to the chlorination of synthetic polymers and copolymers of isoprene.

Chlorinated natural rubber, by virtue of its chemical resistance, hardness, filming properties, and compatibility with alkyd and other resins, has a firmly established place in industrial technology, particularly in the field of protective coatings. With the advent of synthetic rubber-like polymers, numerous proposals have been made looking toward the chlorination of these materials with a view to duplicating chlorinated natural rubber. However, it has not been found possible in this manner to duplicate the desirable stability, chemical inertness, film forming properties, and compatibility with alkyd and other resins, of chlorinated natural rubber.

Accordingly, it is an object of this invention to provide a process for the chlorination of synthetic elastomers to produce products having substantially the same properties as chlorinated natural rubber.

Another object is to provide such a process which may be carried out cheaply and expeditiously in readily and cheaply procurable apparatus.

A further object is to provide such a process which will be applicable to polymers and copolymers of isoprene.

The foregoing and other objects are secured, in accordance with this invention, in a process which involves the following steps:

(1) Contacting an inert solvent solution of an isoprene polymer or copolymer with a gaseous mixture of air or oxygen containing a minor proportion of chlorine, while exposing the solution to ultra-violet light.

(2) Chlorinating the solution which has been pre-treated in accordance with (1). The latter part of this chlorinating step (2) is preferably carried out while exposing the solution to ultra-violet light. The initial portion of the chlorination step (2) may likewise be carried out under exposure to ultra-violet light.

Particularly when conditions are adjusted as more specifically described hereinafter, the chlorinated products resulting from this process are substantially identical in all relevant properties to chlorinated natural rubber.

First with regard to the polymers and copolymers of isoprene entering into the process of this invention, these may be any rubber-like synthetic polymers of isoprene, or rubber-like copolymers thereof with minor proportions (i. e. not over 25%) of other unsaturated compounds on the order of butadiene-1,3, 2,3-dimethyl butadiene-1,3, chloroprene or piperylene; or singly unsaturated compounds on the order of styrene, the halogenated styrenes, vinyl halides, vinyl esters, vinylidene chloride, acrylonitrile, acrylic esters and the like.

Preliminarily to the chlorine and air treatment, the selected isoprene polymer is made up into a solution in a suitable solvent, preferably inert to chlorination, such as carbon tetrachloride, ethylene dichloride, chloroform or the like. The concentration of polymer in the solution should be as high as possible without introducing handling difficulties, concentrations on the order of 2% usually being most suitable. Higher concentrations, on the order of 3% or 4% may be employed, but the solutions are somewhat viscous for convenient handling. There is no particular lower limit on concentration aside from the economic consideration of the quantity of solvent and of reactor space required by unnecessarily dilute solutions. All of the percentages given above are on the basis of the weight of the solutions.

Coming now to the air-chlorine-ultraviolet treatment, the significant variables here are (1) the amount of air (or oxygen) contacting the isoprene polymer solution in unit time, (2) the proportion of chlorine accompanying the air, (3) the intensity and wavelength of the ultra-violet irradiation, (4) the temperature, and (5) the duration of the treatment.

Assuming that the air-chlorine mixture supplied contacts the polymer solution in fairly intimate intermixture (as by rising through a column the solution in the form of small bubbles, or contacting droplets thereof falling through a tower) the air should preferably be supplied at the rate of about 45 liters per hour per liter of solution. Higher rates may be employed, but are usually unnecessary and entrain an excessive amount of solvent. Lower rates, e. g. down to about 20 liters per hour, may be employed, but result in a slower reaction and in an impaired tolerance of the final product for hydrocarbon solvents. In place of air, it will be understood that oxygen or mixtures thereof with inert gases may be employed, the flow rate being adjusted to give a net flow of oxygen equivalent to the oxygen contained in the air supplied at the rates above recommended. On this basis, the gaseous mixture should be supplied at such a rate as to furnish at least about 6, and preferably about 13 liters of oxygen per hour per liter of solution undergoing treatment.

Chlorine is preferably supplied at a rate of about 15 volumes for each 100 volumes of air supplied. If the chlorine is supplied in quantities greater than about 22 volumes per 100 volumes of air, the reaction takes on the nature of a chlorination, rather than the preliminary chlorine-and-air treatment of this invention, and the products do not have the excellent properties characteristic of those produced in accordance with this invention. On the other hand, if the chlorine is supplied in amounts less than about 2.5 volumes per 100 volumes of air, the products are dark in color and are otherwise unsuitable. In case oxygen or some oxygen-bearing gas other than air is employed, it is understood that the amount of chlorine should be increased or decreased in proportion to the ratio of concentration of oxygen in the selected oxygen-bearing gas to the concentration of oxygen in air. On this basis, therefore, chlorine should be supplied at a rate of at least about 8 volumes of chlorine per 100 volumes of oxygen, the preferred ratio being about 50 volumes of chlorine per 100 volumes of oxygen, and the maximum ratio being about 75 volumes of chlorine per 100 volumes of oxygen.

In general, any light source a substantial portion of the spectrum of which lies in the ultra-violet region, may be used to irradiate the reaction mass during the chlorine-and-air treatment. For instance, an incandescent bulb, particularly if of the photoflood type, may be used in the practice of this invention. However, best results are obtained with somewhat shorter wavelengths, such for instance as are produced by electric discharge through mercury vapor.

The temperature of the reaction mass during the preliminary chlorine-and-air treatment should preferably be kept in the range 10°–40° C. Higher temperatures, up to about 80° C. may be used, but increase the difficulty of control and also result in increased entrainment of the solvent by the treating gases. Lower temperatures result in an undesirably slow reaction.

Coming now to the duration of the preliminary chlorine-and-air treatment, under the preferred conditions above outlined, the treatment will have progressed to the desired degree within 2 or 3 hours. One of the effects of the pretreatment appears to be a molecular disaggregation, which is reflected in a progressively decreasing viscosity of the batch being processed. Observation of this viscosity will inform the operator of the extent to which the treatment has proceeded. Assuming that the solution being treated originally contained 2% of rubber, the solvent being carbon tetrachloride, a satisfactory degree of pretreatment will usually have been attained when the viscosity of the solution falls to between about 4 centipoises and about 1 centipoise. Variation of the viscosity to which the batch is reduced provides a tool for the control of the properties of the final product, particularly the solution viscosity of the final product. This is a feature of some interest, and illustrates one difference in the behavior of synthetic elastomers as compared to natural rubber upon chlorination. Natural rubber undergoes a considerable disaggregation and reduction of viscosity upon chlorination, whereas the synthetic rubbers are not greatly altered in this respect by simple chlorination. The irradiated chlorine-and-air treatment of this invention does, however, effect a marked decrease in viscosity of the synthetic polymer, which decrease is carried, with but little further change, into the final chlorinated product.

The chlorination step subsequent to the chlorine-air-ultra-violet treatment may be carried out in accordance with any procedures usual in the art of chlorinating rubber or synthetic rubber-like polymers. Preferably, the pretreated rubber, in solution in an inert solvent, is initially chlorinated by mere contact of the solution with gaseous chlorine. The mass will quite readily absorb the chlorine up to a certain point, which will be designated the "limit of spontaneous chlorination." At this point it will be preferred to irradiate the reaction mass with ultra-violet light of the type previously described, during further chlorination. The chlorination, whether or not conducted under irradiation during the final stages, should be carried out to substantially complete saturation of the isoprene polymer.

The products of this invention are substantially identical in properties and behavior with the chlorinated natural rubbers, being readily soluble in oxygenated solvents to give fluid solutions having a high tolerance for hydrocarbon solvents. The products are compatible with alkyd and other resins with which the chlorinated natural rubbers are ordinarily formulated. The products produced in accordance with this invention form hard, clear and transparent films having excellent resistance to actinic and chemical deterioration. They may be used in place of chlorinated natural rubber in paints, varnishes, enamels, adhesives (particularly for bonding rubber and other elastomers to metal) packaging films and the like. In general, they provide complete and exact replacements for chlorinated natural rubber in any of its usual applications.

With the foregoing general discussion in mind, there is given herewith a detailed formal example of the practice of this invention.

EXAMPLE

The apparatus employed in this example comprised a 2-liter Pyrex glass cylinder 47 cm. tall and 8 cm. in diameter, the walls being 2 mm. thick. A 7 mm. Pyrex glass delivery tube extended down from the top to the bottom of the cylinder. The top of the delivery tube was provided with a T connection, to one branch of which was supplied air and to the other of which was supplied chlorine. Flowmeters were provided in each branch to measure the rate of flow of the respective gases. A quartz tube mercury vapor lamp was set up facing the cylinder, the axis of the lamp reflector being parallel with the axis of the cylinder, and the burner being 20 cm. from the nearest point on the cylinder. A series of runs was made with the above apparatus, using different rates of flow of chlorine and air through the delivery tube, different concentrations of isoprene polymer, etc., as set forth fully hereinafter in Table I.

In each run there was employed a polymerized isoprene (GRS-X-116) which had been milled for 10 minutes, the milled polymer being made up into a solution, in carbon tetrachloride, of concentration selected for the particular run. 2500 grams of this solution were placed in the cylinder, the ultra-violet lamp turned on, and chlorine and air, at rates selected for that particular run, were bubbled into the mass through the delivery tube to provide the air-chlorine-ultraviolet pretreatment of this invention. This pretreatment was carried on for a duration of time selected for the run. At the conclusion of the pretreatment, the flow of air was discontinued, and undiluted chlorine bubbled through the mass to effect the actual chlorination. The ultraviolet lamp was turned on at least during the later stages of the chlorination, although in some runs the lamp was left off during the early stages. At the conclusion of the chlorination, the solution was blown with air to remove chlorinaceous gases, the chlorinated product was precipitated by addition of the solution to methanol, and the precipitated product washed with methanol and dried.

The following properies of processed materials were determined in each run.

(1) The viscosity, in centipoises, of the solution before the pretreatment with chlorine and air. In the case of 2% solutions, this value ranged from 22 to 40 centipoises.

(2) The viscosity, in centipoises, of the solution after the pretreatment (Table I, columns headed "Batch Viscosity").

(3) The viscosity, in centipoises of a 20% toluene solution of the final chlorinated product at 25° C. (Table I, column headed "Viscosity (cps. of 20% toluene solution at 25° C.).")

(4) The percentage of chlorine in the final product (column headed "% Cl").

(5) The dilution ratio, i. e., the volume of mineral spirits which can be added per unit volume of a 5% toluene solution of the final product, without impairing the clarity thereof.

(6) The compatibility of the final product with alkyd resins. This property was determined by making up a toluene solution containing 8% of the product and 22% of a medium oil length, fast drying, drying-oil modified glyptal resin having a viscosity of W-Y on the Gardner-Holdt bubble viscosimeter, a minimum of 30% phthalic anhydride content and an acid number from 3 to 7. This solution was flowed onto a glass plate, and the resultant film dried at room temperature. The clarity, hardness and general quality of the dried film was subjectively rated by the operator with a view to its use as an industrial finish coating. These ratings are set out in Table I, column headed "Compatibility with alkyds."

(7) The "color" rating of Table I is the color of the precipitated and dried product.

From an inspection of Table I it will be seen (item #1) that the ratio of chlorine to air should not be permitted to rise above about 15:70, i. e., about 20 volumes per 100 volumes of air; as under these conditions, chlorination, rather than the chlorine-air pretreatment of this invention begins to take place, and the product is poor in compatibility and stability. Likewise (item 16) the entire omission of chlorine results in a product which is dark colored, unstable and otherwise worthless. Best results were obtained (items 3, 4, 13-15, and 22-24) using about 7 volumes of air per volume of chlorine. It will be noted that the compatibility of the final product with alkyd resins was impaired when the air was supplied at a rate of less than about 20 liters per hour per liter of solution treated.

| Preliminary chlorine-air-ultraviolet treatment | | | | | Chlorination | | Properties of the final product | | | | | | |
|---|---|---|---|---|---|---|---|---|---|---|---|---|---|
| Conc. of Polymer in Solvent (%) | Air (L. per hour) | Cl. (L. per hour) | Time (hr.) | Batch Viscosity at end (cps.) | Initial Period without Ultraviolet (hours) | Final Period with Ultraviolet (hours) | Viscosity (cps. of 20% toluene soln. at 25° C.) | Per cent Cl. | Dilution Ratio | Compatibility with Alkyds | Stability | Color | Run No. |
| 2 | 70 | 15 | 4 | 2.0 | Omitted | 2.0 | 10 | 66.2 | .64 | good | poor | light | 1 |
|   |    |    |   |     | Omitted | 4.0 | 6  | 67.0 | .60 | do   | do   | do    | 2 |
|   |    | 10 | 4 | 2.2 | Omitted | 2.0 | 10 | 64.6 | .54 | do   | good | do    | 3 |
|   |    |    |   |     | Omitted | 3.5 | 10 | 65.8 | .60 | do   | do   | do    | 4 |
|   |    | 5  | 4 | 2.1 | Omitted | 2.5 | 10 | 64.5 | .50 | do   | fair | do    | 5 |
|   |    |    |   |     | Omitted | 4.5 | 8  | 66.7 | .60 | silking | good | do | 6 |
|   |    | 3  | 4 | 2.1 | Omitted | 2.0 | 11 | 63.4 | .70 | good | do   | do    | 7 |
|   |    |    |   |     | Omitted | 4.0 | 10 | 64.8 | .44 | fair | fair | do    | 8 |
|   | 30 | 3  | 4 | 2.4 | Omitted | 1.5 | 18 | 62.5 | .52 | do   | good | do    | 9 |
|   |    |    |   |     | Omitted | 3.5 | 18 | 64.6 | .52 | do   | do   | do    | 10 |
|   | 50 | 5  | 4 | 2.4 | Omitted | 2.  | 8  | 65.8 | .56 | do   | do   | do    | 11 |
|   |    |    |   |     | Omitted | 4.  | 8  | 67.3 | .54 | do   | do   | do    | 12 |
|   | 70 | 10 | 1.3 | 3.9 | Omitted | 2.  | 39 | 63.4 | .32 | poor | do   | do    | 13 |
|   |    |    | 2.0 | 2.9 | Omitted | 2.  | 20 | 62.6 | .28 | fair | poor | do    | 14 |
|   |    |    | 2.5 | 2.5 | Omitted | 2.  | 13 | 64.7 | .32 | do   | do   | do    | 15 |
|   |    | 0  | 2.5 | 4.0 | Omitted | 2.  | 18 | 62.3 | .58 | do   | do   | dark  | 16 |
|   |    | 10 | 3.0 | 2.0 | 1.5 | .5 | 18 | 62.2 | .60 | exc. | good | light | 17 |
|   |    | 0  | 5.0 | 2.0 | 1.0 | .5 | 15 | 61.2 | 1.10 | good | poor | dark | 18 |
|   |    | 5  | 2.0 | 1.9 | 1.5 | .25 | 18 | 61.9 | .52 | do | fair | light | 19 |
|   |    |    |     |     | 1.5 | .5  | 18 | 62.6 | .56 | do | good | do   | 20 |
|   |    | 3  | 2.5 | 1.8 | .75 | .25 | 15 | 61.6 | .52 | exc. | do | do | 21 |
| 3 | 70 | 10 | 4.0 | 8.0 | 1.0 | .5 | 20 | 63.3 | .55 | good | do | do | 22 |
|   |    |    | 6.0 | 8.0 | 1.0 | .5 | 18 | 63.3 | .52 | do | do | do | 23 |
| 4 | 70 | 10 | 8.0 | 8.0 | Omitted | 3. | 18 | 62.3 | .50 | do | do | do | 24 |

From the foregoing general discussion and detailed specific examples, it will be apparent that this invention provides a means whereby the synthetic polymers and copolymers of isoprene may be chlorinated to yield products substantially identical with chlorinated natural rubber. The products produced in accordance with this invention may be used in paints, varnishes, adhesives, packaging and other films, and for any other applications where the chlorinated natural rubbers have heretofore been used. The process may be carried out expeditiously in relatively simple low pressure apparatus, and presents no difficulties of control.

What is claimed is:

1. Process which comprises forming a solution of a substance selected from the group consisting of synthetic polymers of isoprene and copolymers thereof with up to 25% of unsaturated compounds copolymerizable therewith, contacting the solution with a gaseous mixture containing oxygen and from about 8 to about 75 volumes of chlorine per 100 volumes of oxygen, simultaneously irradiating the solution with ultraviolet light, and thereafter chlorinating the selected substance with gaseous chlorine.

2. Process which comprises forming a solution of a synthetic polymer of isoprene, contracting the solution with a gaseous mixture containing oxygen and from about 8 to about 75 volumes of chlorine per 100 volumes of oxygen, simultaneously irradiating the solution with ultraviolet light and thereafter chlorinating the synthetic polymer with gaseous chlorine.

3. Process which comprises forming a solution of a substance selected from the group consisting of synthetic polymers of isoprene and copolymers thereof with up to 25% of unsaturated compounds copolymerizable therewith, contacting the solution with a gaseous mixture containing oxygen and from about 8 to about 75 volumes of chlorine per 100 volumes of oxygen, the mixture being supplied at a rate such as to furnish at least 6 liters of oxygen per liter of solution per hour, simultaneously irradiating the solution with ultraviolet light, and thereafter chlorinating the selected substance with gaseous chlorine.

4. Process which comprises forming a solution of a substance selected from the group consisting of synthetic polymers of isoprene and copolymers thereof with up to 25% of unsaturated compounds copolymerizable therewith, contacting the solution with a gaseous mixture containing oxygen and about 50 volumes of chlorine per 100 volumes of oxygen, the mixture being supplied at such a rate as to furnish at least 6 liters of oxygen per liter of solution per hour, simultaneously irradiating the solution with ultraviolet light, and thereafter chlorinating the selected substance with gaseous chlorine.

5. Process which comprises forming a solution of a substance selected from the group consisting of synthetic polymers of isoprene and copolymers thereof with up to 25% of unsaturated compounds copolymerizable therewith, contacting the solution with a mixture of air with from about 2.5 to about 22 volumes of chlorine per 100 volumes of air, simultaneously irradiating the solution with ultraviolet light, and thereafter chlorinating the selected substance with gaseous chlorine.

6. Process which comprises forming a solution of a substance selected from the group consisting of synthetic polymers of isoprene and copolymers thereof with up to 25% of unsaturated compounds copolymerizable therewith, contacting the solution with a mixture of air with about 15 volumes of chlorine per 100 volumes of air, simultaneously irradiating the solution with ultraviolet light, and thereafter chlorinating the selected substance with gaseous chlorine.

7. Process which comprises forming a solution of a substance selected from the group consisting of synthetic polymers of isoprene and copolymers thereof with up to 25% of unsaturated compounds copolymerizable therewith, contacting the solution with a mixture of air with about 15 volumes of chlorine per 100 volumes of air, the mixture being supplied at a rate such as to furnish about 45 liters of air per hour per liter of solution, simultaneously irradiating the solution with ultraviolet light, and thereafter chlorinating the selected substance with gaseous chlorine.

8. Process which comprises forming a solution of a synthetic polymer of isoprene, contacting the solution with a mixture of air with about 15 volumes of chlorine per 100 volumes of air, the mixture being supplied at a rate such as to furnish about 45 liters of air per hour per liter of solution, simultaneously irradiating the solution with ultraviolet light, and thereafter chlorinating the synthetic polymer with gaseous chlorine.

9. Process which comprises forming a solution of a synthetic polymer of isoprene, contacting the solution with a mixture of air with about 15 volumes of chlorine per 100 volumes of air, the mixture being supplied at a rate such as to furnish about 45 liters of air per hour per liter of solution, simultaneously irradiating the solution with ultraviolet light, and thereafter chlorinating said polymer with gaseous chlorine in the absence of ultraviolet light until the cessation of rapid and spontaneous absorption of chlorine by the polymer, and finally continuing the chlorination with gaseous chlorine while exposing the polymer to ultraviolet light.

ALBERT BARTOVICS.

REFERENCES CITED

The following references are of record in the file of this patent:

UNITED STATES PATENTS

| Number | Name | Date |
| --- | --- | --- |
| 2,181,158 | Sparks et al. | Nov. 28, 1939 |
| 2,222,345 | Blomer et al. | Nov. 19, 1940 |
| 2,291,574 | Gleason et al. | July 28, 1942 |
| 2,292,737 | Blomer et al. | Aug. 11, 1942 |
| 2,301,926 | Blomer et al. | Nov. 17, 1942 |
| 2,345,507 | Smith | Mar. 28, 1944 |